Patented June 6, 1933

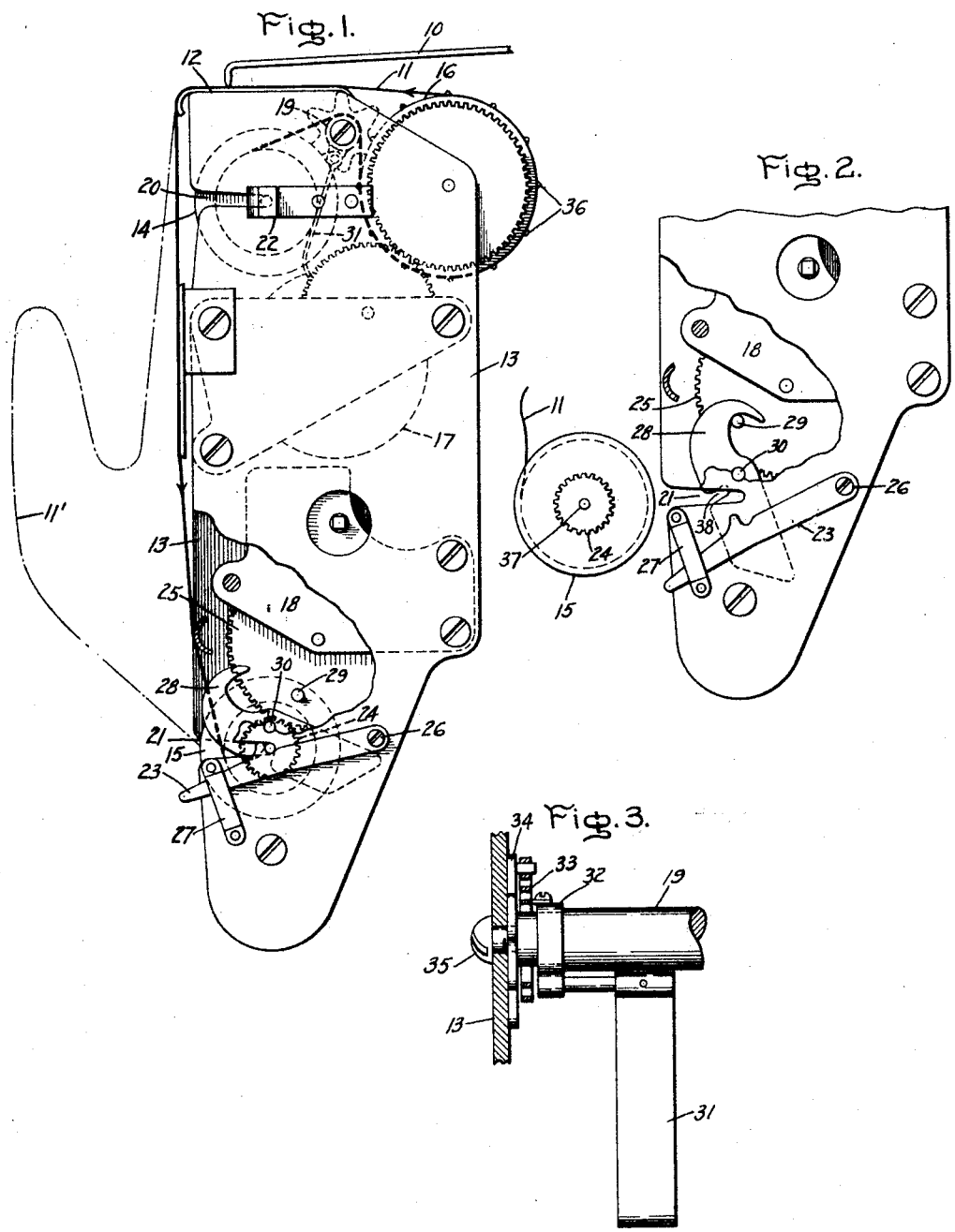

1,913,176

UNITED STATES PATENT OFFICE

PAUL E. TWISS, OF LYNN, MASSACHUSETTS, ASSIGNOR TO GENERAL ELECTRIC COMPANY, A CORPORATION OF NEW YORK

RECORDING INSTRUMENT

Application filed June 29, 1931. Serial No. 547,524.

My invention relates to improvements in recording instruments, and more particularly to the mechanism for moving, tensioning and rerolling the recording film or chart of such instruments.

In one common form of recording instrument a chart is fed from a supply spool over a timing drum past a recording position and to a reroll spool. In order that the chart shall move at a constant rate the timing drum is operated by a clock. A spring motor is employed to operate the reroll and supply the energy for moving the chart. The chart should be maintained under sufficient tension to keep it smooth as it passes the recording position. However, the tension on both sides of the timing drum should be maintained balanced so as to avoid errors in timing. One aspect of my invention is the provision of a chart tensioning device which is arranged to compensate for the change in effective diameter of the reroll spool as the chart is wound thereon so as to maintain a balanced tension on opposite sides of the clock-controlled timing drum. Another aspect of my invention is the provision of a reroll motor without any speed governor and a lock therefor to prevent the motor from running down when the reroll spool is removed from the chart carriage.

The features of my invention which are believed to be novel and patentable will be pointed out in the claims appended hereto. For a better understanding of the invention reference is made in the following description to the accompanying drawing, Fig. 1 of which shows a side view, partially in section, of a chart carriage to which my invention has been applied; Fig. 2 illustrates the operation of the locking device for the reroll motor when the reroll spool is removed from the carriage, and Fig. 3 is a detailed view of the chart tensioning device taken at right angles to the dotted line view of this device in Fig. 1.

In Fig. 1, I have represented that portion of a recording instrument generally referred to as the chart carriage together with the pen 10 of the recording instrument for producing any desired record on the chart represented at 11 as it is moved over the writing table 12. The chart carriage comprises a suitable framework composed of side pieces 13 for supporting between them the various parts for carrying, timing, and moving the chart. These parts comprise in general the supply and reroll spools 14 and 15, a timing drum 16, a clock motor indicated at 17 for moving the timing drum at a constant speed, and a spring motor 18 for operating the reroll spool 15.

The chart 11 is fed from the spool 14 over a tie rod 19 about the timing drum 16 over suitable guides to the reroll spool 15. The supply and reroll spools 14 and 15 are removable through slots 20 and 21 in the frame side pieces and are normally held in the positions shown in Fig. 1 by suitable releasable catches 22 and 23 engaging the shaft ends of the spools and forming bearings for the same. The parts thus far described are quite well-known except it has heretofore been usual when a separate reroll spring motor was used to provide it with some form of speed governor to prevent its sudden unwinding when the reroll spool 15 was withdrawn.

According to my invention it is unnecessary to provide the spring reroll motor 18 with any speed governor. Instead, I provide an automatic lock therefor which comes into operation whenever the reroll spool is withdrawn. The spring motor 18 is connected to the reroll spool through a gear train including a gear 24 on the reroll spool and a gear 25 meshing with gear 24 when the reroll is in normal position. The reroll spool is shown in its normal position in driving relation with the spring motor 18 in Fig. 1. In Fig. 2 the reroll spool is represented as withdrawn as it is necessary to do when the chart is to be renewed. To remove the reroll spool all that is necessary is to throw down catches 23 so as to release the shaft of the spool. The spool may then be withdrawn through the slots 21. Catch 23 is pivoted in the framework at 26 and its free end slides in a slot 27.

The locking device comprises a pivoted hook 28 cooperating with one or more pins 29 extending from the side of gear wheel 25. Hook 28 is pivoted at 30 in the side plate of the framework just above the axis of the reroll spool between the reroll spool and spring motor. The hook has a cam shaped slot 38 on its outer edge adjacent slot 21 along which shaft 37 of the reroll spool moves when the latter is withdrawn and inserted. The width of slot 38 is such that hook 28 is rotated about pivot 30 as the shaft of the reroll spool is removed or inserted in slot 21. For instance, in removing the reroll spool, shaft 37 presses against the upper edge of slot 38 causing hook 28 to take the locking position shown in Fig. 2 and in the path of movement of pin 29, thus preventing the unwinding of the spring motor. The shape of the hook engaging pin 29 is designed to be self-locking. When the reroll spool is inserted, its shaft engages the lower edge of slot 38 and swings the hook in the opposite direction to the unlocked position shown in Fig. 1. Certain important advantages are obtained by omitting the speed governor from the reroll spring motor. It permits rapid winding up of the chart during the initial threading in operation when a new chart is being installed. Oftentimes the operator desires to unwind a considerable length of chart from the reroll spool during normal operation to look at the record thereon. With my invention he pulls the chart from the reroll spool, as indicated in the dot-dash line 11′, without removing the reroll spool. When he releases the chart again it is quickly rerolled. This is not possible where the spring reroll motor is provided with a speed governor to limit its speed of operation.

With the arrangement described it may be desirable, and I prefer to fasten the inner end of the chart to the supply spool as by glue or otherwise so that when the supply spool becomes empty the chart will be stopped until it is renewed. If the end of the chart is not fastened to the supply spool the reroll spool will accelerate and run down when the supply spool becomes empty. However, it is not essential that the end of the chart be fastened to the supply spool since the reroll spring motor is ordinarily wound when a new chart is installed and is nearly run down in any event when the supply spool becomes empty so that no damage will ordinarily result if it is allowed to run down entirely at this time.

Another aspect of the present invention relates to the proper tensioning of the chart on opposite sides of the timing drum 16. It will be apparent that if the tension on the reroll side of the timing drum is materially greater than on the supply roll side the clock motor will tend to be accelerated. The tension of the chart throughout the entire operation should be maintained so that no appreciable amount of energy is transmitted between the timing drum and chart in either direction since this would interfere with the time keeping function of the clock. The timing drum should serve primarily as an escapement for the chart movement and therefore the tension of the chart on opposite sides of the timing drum should be approximately equalized at all times. The pull on the chart from the reroll spool is far from being uniform. When the reroll spool is nearly empty just after a new chart has been installed and the reroll spring motor wound, the tension on the chart at this point is a maximum. As the diameter of the chart reroll increases, the lever arm from the axis of the reroll spool to the periphery of the roll increases and the chart tension decreases accordingly. The tension is further decreased as the reroll roll increases in diameter by reason of the fact that the spring motor is being unwound. It is evident therefore, that the tension of the chart on the reroll side of the timing drum is a maximum just after the chart has been renewed and is a minimum just prior to the time for another renewal. Charts may last for an hour, a week, or a month, depending on circumstances, and during this interval the chart tension is constantly changing. It has been found by long experience that this variable tension must be compensated for if an ordinary clock movement is to be depended upon to maintain the chart movement at a uniform rate. I therefore provide a friction brake on the supply spool, so arranged as to decrease its effect as the supply roll decreases in diameter. This friction brake comprises a friction member 31 pressed against the periphery of the chart roll on the supply spool by means of a suitable spring. This device may take the form shown in Fig. 3. Friction member 31 is supported on the tie rod 19 by a collar 32 free to turn on the rod. The collar is fastened to one end of a spiral spring 33. The other end of the spring is fastened to member 34 which may be adjusted about its axis on the tie rod 19 and fastened in any position by means of the screw 35 which passes through the side plate 13 into the end of the tie rod 19. It is seen that the tension with which the friction member 31 is pressed against the supply roll may be adjusted by this means. As the supply roll decreases in diameter, the friction member 31 moves in a clockwise direction as viewed in Fig. 1, turning collar 32, and allowing the spring 33 to unwind. It is evident, therefore that the friction decreases as the supply roll decreases in diameter. By properly adjusting the initial tension of the spring and selecting a spring having the desired characteristics and strength I may approximately compensate for the variation in tension produced by the reroll device at different diameters of rolls on the reroll and supply spools. The friction device gradually decreases the energy required to pull the chart off the supply spool as the diameter of this roll decreases, thus balancing the gradually decreasing pull on the chart by the reroll mechanism as the diameter of the rerolled chart increases. Thus the tension on opposite sides of the timing drum is maintained substantially balanced and there is no interference with the time-keeping properties of the clock 17 and there is no tendency for the chart to be torn through the holes provided therein which mesh with the pins 36 on the timing drum. The screw 35 and the adjusting wheel 34 are accessible from the side of the chart carriage for adjusting purposes.

The details of construction may be altered without departing from the invention and such modifications as are within the time, spirit and scope of the invention are intended to be covered by the claims appended hereto.

What I claim as new and desire to secure by Letters Patent of the United States is:—

1. In a recording instrument a chart supply spool, a chart reroll spool, a chart adapted to be moved from the supply spool to the reroll spool, a timing drum engaging said chart between said spools, means for operating said timing drum at constant speed, means for driving the reroll spool to move the chart, and friction means associated with the supply spool for maintaining the tension of the chart on the supply side of the timing drum substantially equal to the tension of the chart on the reroll side of said drum as the chart is moved from the supply spool to the reroll spool.

2. In a recording instrument, a chart supply spool, a chart reroll spool, a chart adapted to be unwound from the supply spool onto the reroll spool, clock driven means engaging said chart between said spools for causing the chart to move at a uniform rate, a spring motor for turning the reroll spool in a direction to wind the chart thereon from the supply spool, said motor supplying substantially all of the energy for moving the chart, a spring pressed friction member engaging the surface of the chart on the supply spool whereby the chart is maintained under tension between the supply and reroll spools, said spring pressed friction member decreasing its friction pressure as the diameter of the chart roll on the supply spool decreases, to the extent to substantially compensate for the decreasing pull on the chart by the reroll spool as the diameter of the chart roll thereon increases, whereby the tension on the chart on opposite sides of the clock driven means is maintained substantially balanced.

3. In a recording instrument, a chart carriage, a reroll spool removable from the carriage, a spring motor in driving relation with said reroll spool when the latter is in the chart carriage, said driving relation being disconnected when the spool is removed from the carriage, and a lock for said spring motor which is moved from an unlocking position to a locking position and vice versa when said spool is removed from and inserted in the chart carriage respectively.

4. In a recording instrument, a chart carriage, a reroll spool having bearings in the carriage but removable therefrom, driving means in driving relation with said spool when in the carriage, said driving relation being interrupted by the removal of said spool from the carriage, and means responsive to the removal of said spool from the carriage for locking said driving means.

5. In a recording instrument, a chart carriage, a reroll spool, a motor free to operate at different speeds connected to drive said spool, means whereby said spool may be removed from the carriage and from driving relation with said motor, and means responsive to the removal of said spool from the carriage for locking said motor, said means being also responsive to the replacement of said spool in the carriage for unlocking said motor.

6. In a recording instrument, a chart carriage, a reroll spool, a shaft therefor having bearings in said chart carriage but removable therefrom, a motor-driven gear wheel, a gear on the reroll spool with which the motor-driven gear meshes only when the spool is in the carriage, a lock for the motor-driven gear pivoted in the chart carriage between the motor-driven gear and one of the spool bearings, said lock having an extension adjacent such bearing which is engaged by the spool shaft when the spool is withdrawn and inserted into the carriage for moving said lock to locking and unlocking positions respectively.

In witness whereof, I have hereunto set my hand.

PAUL E. TWISS.